United States Patent
Abe

(10) Patent No.: US 12,255,521 B2
(45) Date of Patent: Mar. 18, 2025

(54) TRILATERAL CYCLE SYSTEM

(71) Applicant: ISUZU MOTORS LIMITED, Tokyo (JP)

(72) Inventor: Makoto Abe, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 18/551,776

(22) PCT Filed: Mar. 17, 2022

(86) PCT No.: PCT/JP2022/012149
§ 371 (c)(1),
(2) Date: Sep. 21, 2023

(87) PCT Pub. No.: WO2022/202585
PCT Pub. Date: Sep. 29, 2022

(65) Prior Publication Data
US 2024/0178725 A1    May 30, 2024

(30) Foreign Application Priority Data
Mar. 22, 2021 (JP) .................... 2021-046805

(51) Int. Cl.
*H02K 9/20* (2006.01)
*F01D 15/10* (2006.01)
(Continued)

(52) U.S. Cl.
CPC .............. *H02K 9/20* (2013.01); *F01D 15/10* (2013.01); *F01D 25/12* (2013.01); *H02K 7/1823* (2013.01)

(58) Field of Classification Search
CPC .................................. H02K 9/20; F01D 25/12
See application file for complete search history.

(56) References Cited

U.S. PATENT DOCUMENTS 4,663,939 A * 5/1987 Cosby ...................... F02C 1/10
60/682
6,329,731 B1 * 12/2001 Arbanas ................ F16H 57/043
310/58
(Continued)

FOREIGN PATENT DOCUMENTS

EP        2426435 A2    3/2012
JP    2007-187422 A    7/2007
(Continued)

OTHER PUBLICATIONS

Patent Cooperation Treaty, International Search Report, Application No. PCT/JP2022/012149, dated May 13, 2022, in 5 pages.
(Continued)

*Primary Examiner* — Tulsidas C Patel
*Assistant Examiner* — Thomas K Quigley
(74) *Attorney, Agent, or Firm* — PROCOPIO, CORY, HARGREAVES & SAVITCH LLP

(57) ABSTRACT

A temperature adjustment mechanism for a vehicle includes a battery-applied pump and circulation paths, and adjusts a temperature of a battery chargeable from an external power supply outside the vehicle to be within a predetermined temperature range. The temperature adjustment mechanism further includes a vacuum insulation tank in which either cold water generated by a cold energy source or hot water heated by a hot energy source is stored according to an ambient temperature during charging of the battery from the external power supply. At a time of input and output of electric power in the battery excluding a charge from the external power supply, the vacuum insulation tank is connected to the circulation paths, the cold water or the hot water stored in the vacuum insulation tank is supplied to the battery by driving the battery-applied pump, and a battery temperature is kept within the temperature range.

6 Claims, 5 Drawing Sheets

(51) Int. Cl.
*F01D 25/12* (2006.01)
*H02K 7/18* (2006.01)

(56) References Cited

U.S. PATENT DOCUMENTS

| | | | | |
|---|---|---|---|---|
| 7,489,057 | B2* | 2/2009 | Zhou | H02K 9/197 |
| | | | | 310/61 |
| 7,579,725 | B2* | 8/2009 | Zhou | H02K 9/197 |
| | | | | 310/61 |
| 8,567,193 | B2* | 10/2013 | Terashima | F01K 23/065 |
| | | | | 60/661 |
| 9,252,642 | B2* | 2/2016 | Büttner | H02K 9/225 |
| 9,257,883 | B2* | 2/2016 | Büttner | H02K 9/14 |
| 9,638,104 | B2* | 5/2017 | Cho | F23R 3/005 |
| 10,746,084 | B2* | 8/2020 | Sabate | A61B 6/4488 |
| 11,476,736 | B2* | 10/2022 | Dircks | H02K 5/20 |
| 11,626,765 | B2* | 4/2023 | Ronning | H02K 1/2733 |
| | | | | 310/59 |
| 11,888,356 | B2* | 1/2024 | Ronning | H02K 7/116 |
| 2009/0121563 | A1* | 5/2009 | Zhou | H02K 9/197 |
| | | | | 310/54 |
| 2011/0005477 | A1* | 1/2011 | Terashima | F01K 23/065 |
| | | | | 165/104.19 |
| 2014/0368064 | A1* | 12/2014 | Fedoseyev | H02K 9/225 |
| | | | | 310/54 |
| 2020/0227964 | A1* | 7/2020 | Ronning | H02K 1/2733 |
| 2020/0373814 | A1* | 11/2020 | Dircks | H02K 5/203 |
| 2022/0153426 | A1* | 5/2022 | Holley | F01K 25/103 |
| 2023/0208228 | A1* | 6/2023 | Ronning | H02K 1/32 |
| | | | | 310/59 |
| 2024/0063672 | A1* | 2/2024 | Ronning | H02K 9/19 |

FOREIGN PATENT DOCUMENTS

| | | |
|---|---|---|
| JP | 2009-174494 A | 8/2009 |
| JP | 2012-127201 A | 7/2012 |
| JP | 2018-009458 A | 1/2018 |

OTHER PUBLICATIONS

Patent Cooperation Treaty, WOSA, Application No. PCT/JP2022/012149, dated May 13, 2022, in 4 pages.

* cited by examiner

TRILATERAL CYCLE SYSTEM

CROSS-REFERENCE TO RELATED APPLICATIONS

This application is US National Stage of International Patent Application PCT/JP2022/012149, filed Mar. 17, 2022, which claims benefit of priority from Japanese Patent Application 2021-046805, filed Mar. 22, 2021, the contents of both of which are incorporated herein by reference.

TECHNICAL FIELD

The present invention relates to a trilateral cycle system, and more particularly, to a trilateral cycle system including an expander driven by a working fluid in a gas-liquid two-phase flow supplied from a heat exchanger, and a power generator connected to the expander.

BACKGROUND ART

Although not a trilateral cycle system, there has been proposed a Rankine cycle system in which an expander and a power generator are accommodated in a sealed container, and an internal space of the sealed container in which the power generator is disposed is formed by a part of a flow path between a pump and a heater (heat exchanger) (for example, see Patent Literature 1). In the Rankine cycle system described in Patent Literature 1, the power generator is cooled by the working fluid before being heated by the heater, thereby preventing temperature rise of the power generator and preheating the working fluid before flowing into the heater.

CITATION LIST

Patent Literature

Patent Literature 1: JP2009-174494A

SUMMARY OF INVENTION

Technical Problem

There is known a trilateral cycle system that constitutes a substantially triangular shape in a temperature-entropy diagram as a system for recovering energy from a low-temperature heat source in exhaust heat recovery. A trilateral cycle is also referred to as a gas-liquid two-phase adiabatic expansion cycle, and is a cycle in which the working fluid is brought into a gas-liquid two-phase state after heat exchange from a heat source to the working fluid, and the working fluid in the gas-liquid two-phase state is decompressed and boiled in the expander to extract energy.

Even when the invention described in Patent Literature 1 is applied to the trilateral cycle, since the power generator is cooled by the working fluid before being heated by the heater, the working fluid having different temperature zones is present inside one sealed container. Therefore, even when the invention described in Patent Literature 1 is applied to the trilateral cycle, since the high-temperature working fluid is cooled or the low-temperature working fluid is heated inside the sealed container, a measure for heat-insulating an inside of the sealed container is essential, and the inside of the sealed container is complicated. Further, since two flow paths are connected to the sealed container, the flow paths of the system are restricted. As described above, even if the technical matter of the Rankine cycle system is simply used in the trilateral cycle system, the cooling of the power generator and the recovery of exhaust heat from the power generator cannot be both achieved with a simple configuration.

The inventor of the present application focused on a fact that a working fluid supplied from a heat exchanger to an expander is in a gas-liquid two-phase state in a trilateral cycle, and found that the working fluid in the gas-liquid two-phase flow flowing into the expander is used.

An object of the present disclosure is to provide a trilateral cycle system that achieves both cooling of a power generator and recovery of exhaust heat from the power generator by using a working fluid in a gas-liquid two-phase flow.

Solution to Problem

According to an aspect of the present invention for achieving the above object, there is provided a trilateral cycle system including: an expander driven by a working fluid in a gas-liquid two-phase flow, the working fluid being supplied from a heat exchanger; and a power generator connected to the expander, in which the power generator is disposed at an intermediate position of a passage, which is configured to allow the working fluid in the gas-liquid two-phase flow to flow therethrough, between the heat exchanger and the expander, and a cooling passage for cooling the power generator forms a part of the passage.

Advantageous Effects of Invention

According to the aspect of the present invention, when the working fluid in the gas-liquid two-phase flow flows through the cooling passage, the working fluid of the liquid phase evaporates due to heat of the power generator, and thus the exhaust heat from the power generator can be recovered while cooling the power generator.

DESCRIPTION OF EMBODIMENTS

Figure 1:
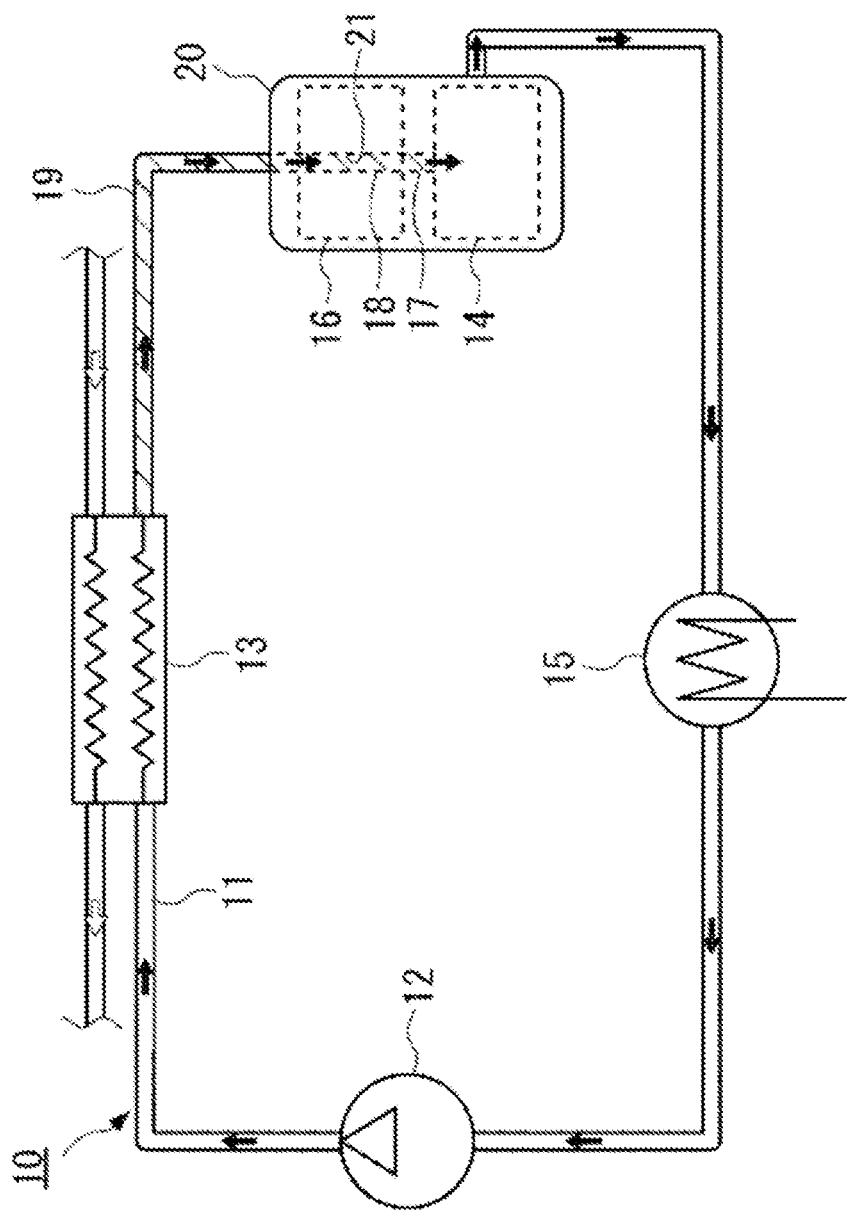
FIG. 1 is a configuration diagram illustrating a trilateral cycle system according to an embodiment.

Hereinafter, an embodiment of a trilateral cycle system according to the present disclosure will be described. In the drawings, white arrows indicate a flow of exhaust heat, and filled arrows indicate a flow of a working fluid. In the drawings, dimensions of members are changed for easy understanding of the configuration, and are not always matched with those actually manufactured. Hereinafter, in the present disclosure, a passage indicates a portion through which the working fluid flows, and a pipe indicates a member constituting the passage.

As illustrated in FIG. 1, a trilateral cycle system 10 of the embodiment is a system for converting exhaust heat from an engine (not illustrated) into electric power and recovering the electric power. The exhaust heat of the engine is, for example, exhaust gas generated by combustion of fuel and cooling water for cooling heat generated by combustion. In the trilateral cycle system 10, a state of a working fluid flowing into the expander 14 is not dry steam, but is a gas-liquid two-phase state, and the exhaust heat can be recovered even when the exhaust heat of the engine is at a low temperature of 100° C. or less. Therefore, as a heat source of the trilateral cycle system 10, cooling water of the engine is suitable, and the trilateral cycle system 10 of the present embodiment adopts the cooling water as the exhaust heat. The working fluid of the trilateral cycle system 10 is, for example, ethanol.

In the trilateral cycle system 10, a pump 12, a heat exchanger 13, an expander 14, and a condenser 15 are arranged in this order with respect to a flow of the working fluid in a circulation passage 11 through which the working fluid circulates. The trilateral cycle system 10 includes a power generator 16 connected to the expander 14.

The working fluid circulated by the pump 12 through the circulation passage 11 is heated by heat exchange with the cooling water of the engine in the heat exchanger 13, and becomes a working fluid in a gas-liquid two-phase flow. The working fluid in the gas-liquid two-phase flow passes through the heat exchanger 13 and then drives the expander 14. The working fluid drives the expander 14, then is cooled by the condenser 15, and returns to the pump 12 again. Electric power generated by the power generator 16 when the expander 14 is driven is stored in a battery (not shown).

The trilateral cycle system 10 includes a housing 20 and a cooling passage 21. The trilateral cycle system 10 has a structure in which the expander 14 and the power generator 16 are accommodated inside one housing 20, and inside the housing 20, an output shaft 17 of the expander 14 and a drive shaft 18 of the power generator 16 are coaxially arranged and directly connected. In the trilateral cycle system 10, the power generator 16 is disposed at an intermediate position of a passage 19 which exists between the heat exchanger 13 and the expander 14 in the circulation passage 11 and through which the working fluid in the gas-liquid two-phase flow after passing through the heat exchanger 13 flows, and the cooling passage 21 for cooling the power generator 16 forms a part of the passage 19. In the drawing, a hatched portion indicates the passage 19.

Figure 2:
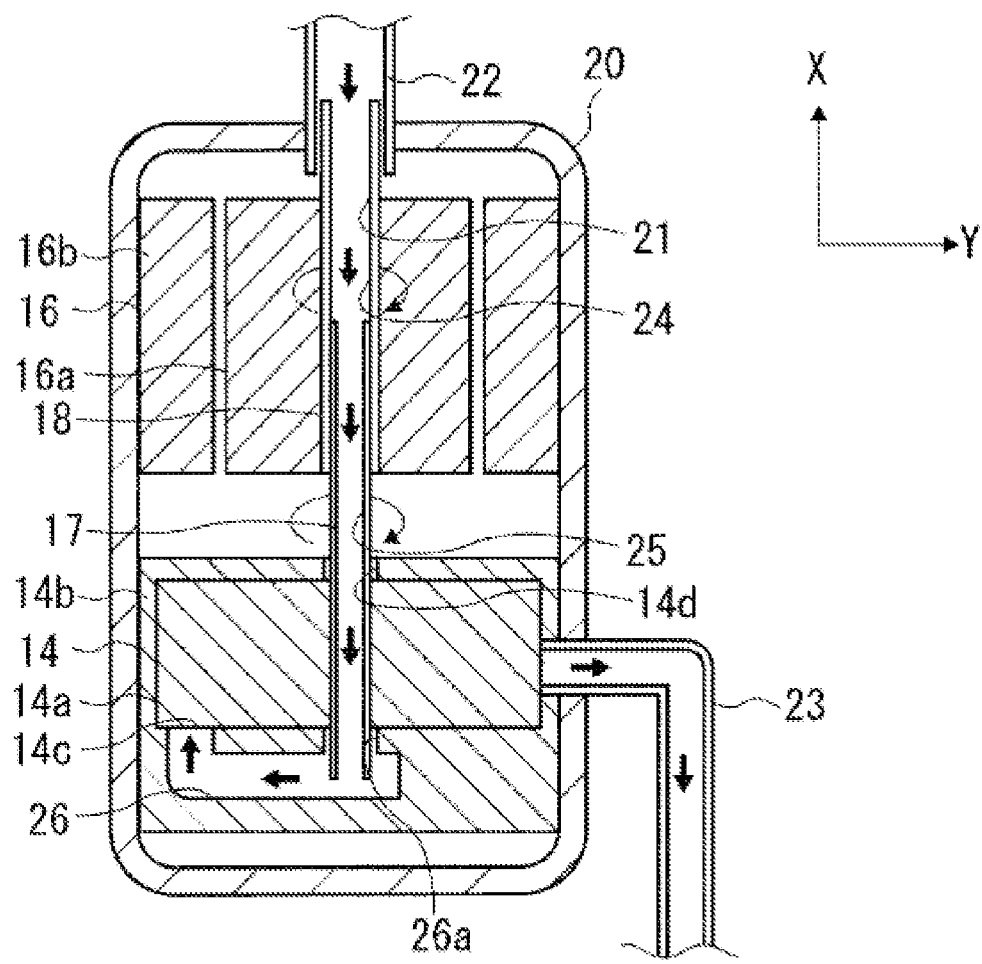
FIG. 2 is a cross-sectional view illustrating an example of an inside of a housing in FIG. 1.

In FIG. 2, an X direction indicates an axial direction of the output shaft 17 and the drive shaft 18, and a Y direction indicates a direction orthogonal to the X direction. In the present disclosure, a leading end and a trailing end are based on the flow of the working fluid, the leading end indicates one end existing on an upstream side, and the trailing end indicates the other end existing on a downstream side.

As illustrated in FIG. 2, the expander 14 includes a fluid device 14a that converts energy of the working fluid in the gas-liquid two-phase flow into rotational motion of the output shaft 17, and an expander housing 14b that accommodates the fluid device 14a. Examples of the fluid device 14a include a turbo type (centrifugal turbine or axial flow turbine) and a displacement type (vane expander, scroll expander, screw expander), and are not particularly limited. The expander 14 of the present embodiment employs a rotary expander in which the fluid device 14a has a structure in which a vane slides on an outer peripheral surface or an inner peripheral surface of a piston.

The power generator 16 includes a rotor 16a fixed to the drive shaft 18, and a stator 16b disposed around the rotor 16a and fixed to the housing 20. The power generator 16 is electrically connected to a battery via an inverter (not shown). The cooling passage 21 for cooling the power generator 16 is formed inside the power generator 16.

The housing 20 has a sealed structure, the power generator 16 is accommodated on the upstream side and the expander 14 is accommodated on the downstream side with respect to the flow of the working fluid in the gas-liquid two-phase flow. An inlet pipe 22 and an outlet pipe 23 are connected to the housing 20.

The inlet pipe 22 is one of pipes constituting the passage 19, and is a pipe through which the working fluid in the gas-liquid two-phase flow after passing through the heat exchanger 13 flows inside the housing 20. A trailing end of the inlet pipe 22 is disposed inside the housing 20. The outlet pipe 23 is a pipe through which the working fluid after passing through the expander 14 flows out to an outside of the housing 20.

The cooling passage 21 is a part of the passage 19, and is a passage having a leading end communicating with the inlet pipe 22, an intermediate position passing through the power generator 16, and a trailing end communicating with an inlet 14c of the fluid device 14a of the expander 14. The cooling passage 21 is a passage through which the working fluid in the gas-liquid two-phase flow flows, and a drive-shaft-applied passage 24, an output-shaft-applied passage 25, and a communication passage 26 are disposed in this order from the upstream side with respect to the flow of the working fluid.

The drive-shaft-applied passage 24 is a passage formed inside the drive shaft 18, and the working fluid in the gas-liquid two-phase flow flows therethrough. The drive-shaft-applied passage 24 has a leading end communicating with the inlet pipe 22 and a trailing end communicating with the output-shaft-applied passage 25. The drive shaft 18 inside which the drive-shaft-applied passage 24 is formed is implemented by a pipe, and the rotor 16a is fixed to an outer peripheral surface of the pipe.

The output-shaft-applied passage 25 is a passage formed inside the output shaft 17, and the working fluid in the gas-liquid two-phase flow after passing through the drive-shaft-applied passage 24 flows therethrough. The output-shaft-applied passage 25 has a leading end communicating with the drive-shaft-applied passage 24 and a trailing end communicating with the communication passage 26. The output shaft 17 inside which the output-shaft-applied passage 25 is formed is implemented by a pipe, and the pipe is rotationally driven by the fluid device 14a.

The communication passage 26 is a passage formed in the expander housing 14b, and the working fluid in the gas-liquid two-phase flow after passing through the output-shaft-applied passage 25 flows therethrough. The communication passage 26 has a leading end communicating with the output-shaft-applied passage 25, and a trailing end communicating with the inlet 14c of the fluid device 14a.

A pipe outer diameter of the drive shaft 18 is equal to or smaller than a pipe inner diameter of the inlet pipe 22. A leading end of the drive shaft 18 is disposed inside the inlet pipe 22. The drive shaft 18 rotatably communicates with the inlet pipe 22 through the drive-shaft-applied passage 24. It is desirable that the pipe outer diameter of the drive shaft 18 is smaller than the pipe inner diameter of the inlet pipe 22. When the pipe outer diameter of the drive shaft 18 is smaller than the pipe inner diameter of the inlet pipe 22, the outer peripheral surface of the drive shaft 18 is not in contact with an inner peripheral surface of the inlet pipe 22, which is advantageous in reducing a resistance load caused by the contact. When the pipe outer diameter of the drive shaft 18 is smaller than the pipe inner diameter of the inlet pipe 22, a gap is formed between the outer peripheral surface of the drive shaft 18 and the inner peripheral surface of the inlet pipe 22. Since an outlet of the expander 14 is at a pressure lower than a pressure inside the housing 20, the working fluid in the gas-liquid two-phase flow flows from the inlet pipe 22 to the drive shaft 18, and does not leak out from the gap. Even if the working fluid in the gas-liquid two-phase flow leaks out from the gap, the working fluid remains inside the housing 20 and does not leak out to the outside of the housing 20.

A pipe outer diameter of the output shaft 17 is the same as a pipe inner diameter of the drive shaft 18. A leading end of the output shaft 17 is disposed inside the drive shaft 18. An outer peripheral surface of the output shaft 17 is fixed to an inner peripheral surface of the drive shaft 18. It is desirable that the output shaft 17 extends such that the leading end thereof is positioned at a center portion of the power generator 16. When the leading end of the output shaft 17 is positioned at the center portion of the power generator 16, a fixing area between the output shaft 17 and the drive shaft 18 increases, which is advantageous for fixing the rotating pipes to each other. In order to increase the fixing area between the output shaft 17 and the drive shaft 18, the leading end of the output shaft 17 may be disposed upstream of the central portion of the power generator 16 with respect to the flow of the working fluid. The trailing end of the drive shaft 18 may protrude from the power generator 16 toward an expander 14 side.

A through hole 26a penetrating in the X direction is formed in a passage wall surface on an upper side in the X direction at a trailing end portion of the communication passage 26. A hole diameter of the through hole 26a is equal to or larger than the pipe outer diameter of the output shaft 17. The trailing end of the output shaft 17 protrudes downward in the X direction from the fluid device 14a and is disposed inside the trailing end portion of the communication passage 26 through the through hole 26a. The output shaft 17 rotatably communicates with the communication passage 26 through the output-shaft-applied passage 25. It is desirable that the hole diameter of the through hole 26a is larger than the pipe outer diameter of the output shaft 17. When the hole diameter of the through hole 26a is larger than the pipe outer diameter of the output shaft 17, the outer peripheral surface of the output shaft 17 is not in contact with the expander housing 14b, which is advantageous in reducing a resistance load caused by the contact. Similarly, a hole diameter of a through hole 14d, which is formed at an upper end of the expander housing 14b in the X direction and through which the output shaft 17 is inserted, is equal to or larger than the pipe outer diameter of the output shaft 17, and it is desirable that the hole diameter is larger than the pipe outer diameter of the output shaft 17.

The working fluid in the gas-liquid two-phase flow passing through the heat exchanger 13 flows through the inlet pipe 22, the drive-shaft-applied passage 24, the output-shaft-applied passage 25, the communication passage 26, the fluid device 14a, and the outlet pipe 23 in this order. When passing through the drive-shaft-applied passage 24, if a temperature of the power generator 16 is higher than a temperature of the working fluid in the gas-liquid two-phase flow, the working fluid of a liquid phase evaporates and takes evaporation heat from the power generator 16 in the process of evaporation. As a result, the power generator 16 is cooled, and the working fluid in the gas-liquid two-phase flow recovers the exhaust heat from the power generator 16.

As described above, in the trilateral cycle system 10 of the present embodiment, the cooling passage 21 for cooling the power generator 16 is implemented by a part of the passage 19 through which the working fluid in the gas-liquid two-phase flow after passing through the heat exchanger 13 flows. Therefore, according to the trilateral cycle system 10, when the working fluid in the gas-liquid two-phase flow in the cooling passage 21 flows through the cooling passage 21, the working fluid of the liquid phase evaporates by the heat of the power generator 16, and thus the exhaust heat from the power generator 16 can be recovered while cooling the power generator 16.

A technique of cooling a power generator or a motor generator, that is mounted on a vehicle, with cooling water of an engine is a well-known and common technique. In the trilateral cycle system 10 of the present embodiment, the cooling water of the engine is used as exhaust heat of the engine. Therefore, the temperature of the working fluid in the gas-liquid two-phase flow flowing into the expander 14 is lower than the temperature of the cooling water of the engine, and the power generator 16 can be sufficiently cooled as long as the power generator is a power generator or a motor generator within a category of well-known and commonly used technique. Specifications of the power generator 16 of the present embodiment can be appropriately changed.

In the trilateral cycle system 10, it is desirable that the expander 14 and the power generator 16 are accommodated inside the one housing 20. As in the present embodiment, since the expander 14 and the power generator 16 are accommodated inside the one housing 20, even if the working fluid leaks out from the output shaft 17 of the expander 14, the leaked working fluid remains inside the housing 20 and can be prevented from flowing out to the outside. This makes it possible to reduce a frequency of periodic maintenance caused by the outflow of the working fluid.

In the trilateral cycle system 10, it is desirable that the output shaft 17 of the expander 14 and the drive shaft 18 of the power generator 16 are coaxially arranged, and a passage for the working fluid in the gas-liquid two-phase flow is formed inside each of the shafts. When both the output shaft 17 and the drive shaft 18 are constituted by pipes in each of which the shaft-applied passage is formed as in the present embodiment, it is not necessary to separately provide the pipe for forming the cooling passage 21. Therefore, an integrated structure in which the expander 14 and the power generator 16 are accommodated inside the one housing 20 can be made compact.

Although the embodiment of the present disclosure has been described above, the trilateral cycle system 10 of the present disclosure is not limited to a specific embodiment, and various modifications and changes are possible within the scope of the gist of the present disclosure.

Figure 3:
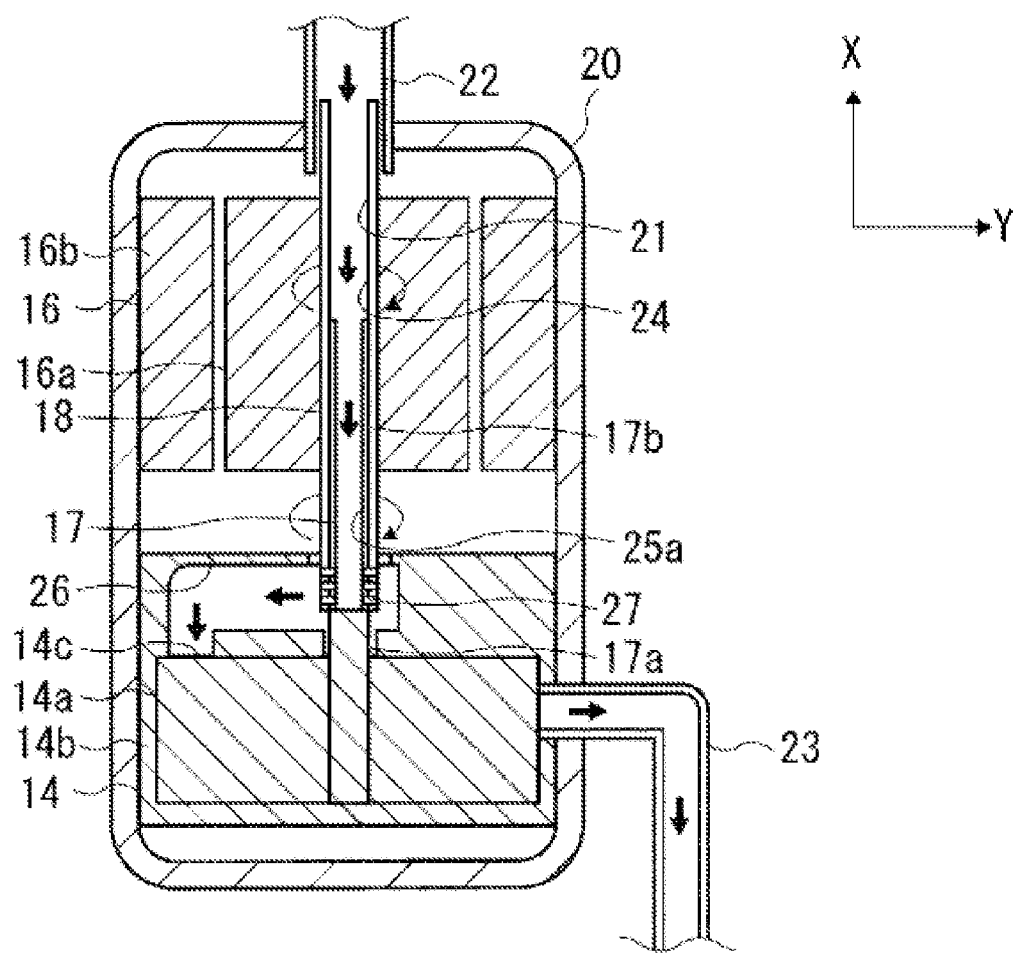
FIG. 3 is a cross-sectional view illustrating a first modification of the inside of the housing in FIG. 1.

As illustrated in FIG. 3, the trilateral cycle system 10 may be configured such that, when the output shaft 17 of the expander 14 and the drive shaft 18 of the power generator 16 are coaxially arranged and connected to each other, the output shaft 17 communicates, at an intermediate position thereof, with the communication passage 26. In the output shaft 17, a solid shaft 17a and a hollow shaft 17b implemented by a pipe are coaxially connected, and a trailing end of the hollow shaft 17b is disposed inside the communication passage 26. The trailing end of the drive shaft 18 is also disposed inside the communication passage 26. A plurality of through holes 27 are formed in a pipe wall in which two pipes including a trailing end portion of the hollow shaft 17b and a trailing end portion of the drive shaft 18 overlap each other. It is desirable to improve the durability, which is lowered by forming the plurality of through holes 27 in the trailing end portion, by overlapping the trailing end portion of the hollow shaft 17b and the trailing end portion of the drive shaft 18 inside the communication passage 26.

Figure 4:
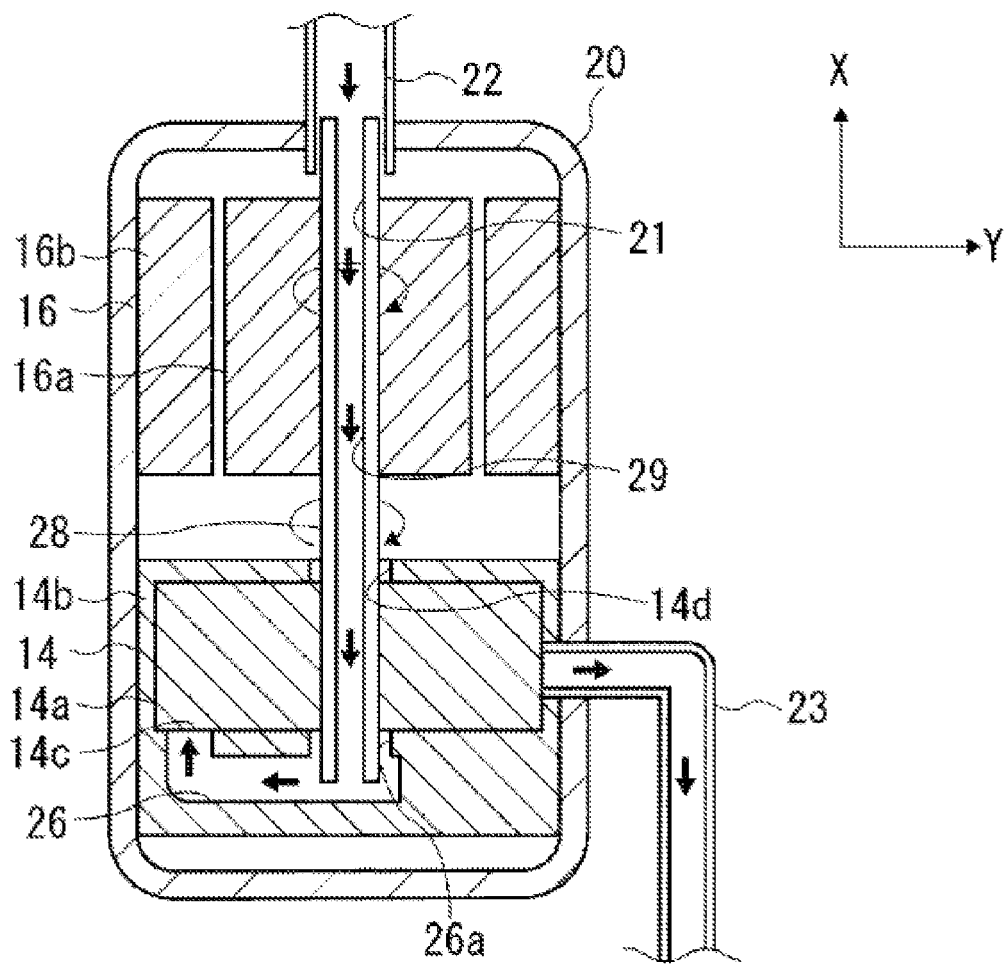
FIG. 4 is a cross-sectional view illustrating a second modification of the inside of the housing in FIG. 1.

As illustrated in FIG. 4, in the trilateral cycle system 10, when the expander 14 and the power generator 16 are connected by one output and drive shaft 28, a shaft-applied passage 29 may be formed inside the output and drive shaft 28, and the output and drive shaft 28 may be implemented by a pipe. The rotor 16a is fixed to an upper portion of the output and drive shaft 28 in the X direction, and the fluid device 14a is fixed to a lower portion in the X direction.

Figure 5:
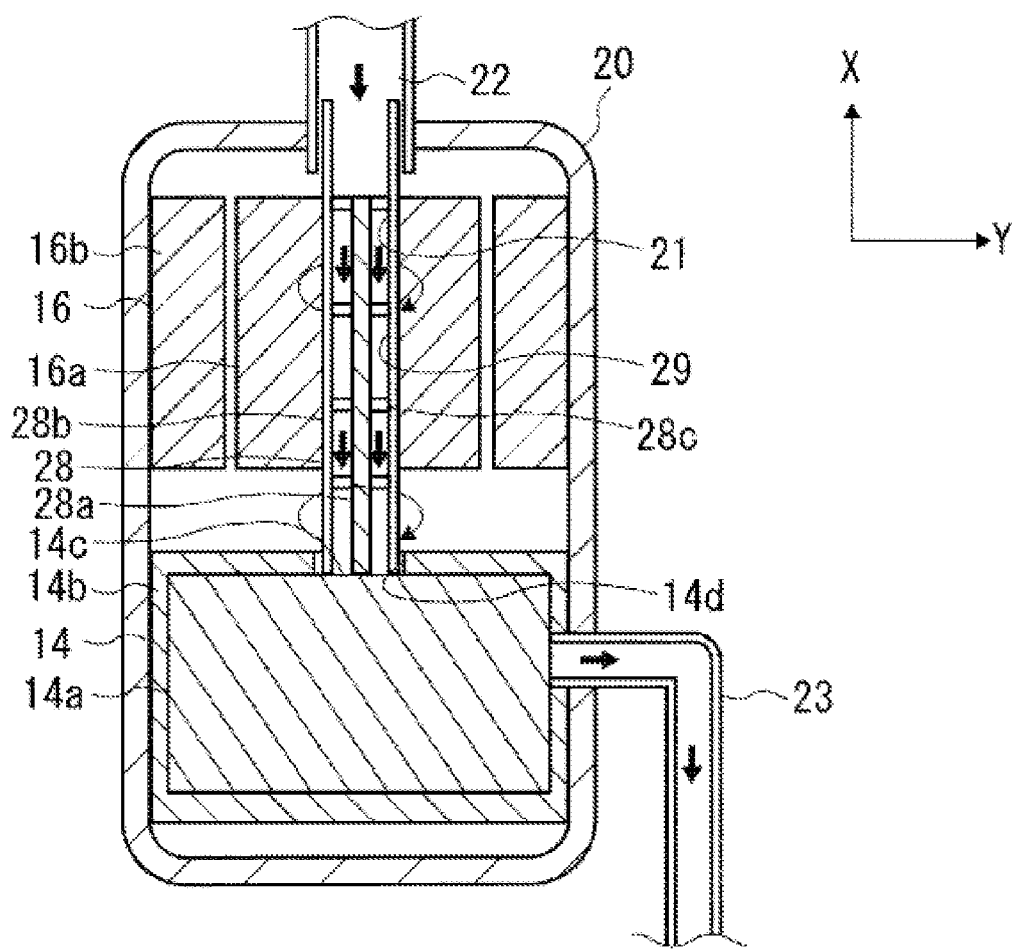
FIG. 5 is a cross-sectional view illustrating a third modification of the inside of the housing in FIG. 1.

As illustrated in FIG. 5, the output and drive shaft 28 may include a solid output shaft portion 28a and a hollow drive shaft portion 28b in which the output shaft portion 28a is disposed at an axial center, and the output shaft portion 28a and the drive shaft portion 28b may be connected to each other by a connection portion 28c. In the output and drive shaft 28, the fluid device 14a of the expander 14 is fixed to the output shaft portion 28a, and the rotor 16a of the power generator 16 is fixed to the drive shaft portion 28b. When the output and drive shaft 28 is provided, the trailing end of the output and drive shaft 28 is directly connected to the inlet 14c of the fluid device 14a of the expander 14 in the cooling passage 21.

As described above, the connection between the expander 14 and the power generator 16 and the configuration of the cooling passage 21 can be appropriately changed depending on specifications of the fluid device 14a of the expander 14 and the durability of each pipe.

The trilateral cycle system 10 of the present disclosure is not limited to the integrated structure in which the expander 14 and the power generator 16 are accommodated inside the one housing 20, and the expander 14 and the power generator 16 may be provided separately from the circulation passage 11 of the trilateral cycle system 10.

Further, the trilateral cycle system 10 of the present disclosure is not limited to the configuration in which the cooling passage 21 is formed inside the output shaft 17 of the expander 14 and the drive shaft 18 of the power generator 16, and may be configured such that the shafts and the cooling passage 21 are separately provided.

The present application is based on the Japanese patent application filed on Mar. 22, 2021 (Patent Application No. 2021-046805), and the contents thereof are incorporated herein by reference.

INDUSTRIAL APPLICABILITY

The present disclosure has an effect that, when a working fluid in a gas-liquid two-phase flow flows through a cooling passage, the working fluid of a liquid phase evaporates due to heat of a power generator, thus cooling the power generator and recovering exhaust heat from the power generator, and is useful for a trilateral cycle system or the like.

REFERENCE SIGNS LIST 10 trilateral cycle system
11 circulation passage
12 pump
13 heat exchanger
14 expander
15 condenser
16 power generator
17 output shaft
18 drive shaft
19 passage
20 housing
21 cooling passage

The invention claimed is:

1. A trilateral cycle system comprising:
an expander driven by a working fluid in a gas-liquid two-phase flow, the working fluid being supplied from a heat exchanger; and
a power generator connected to the expander,
wherein the power generator is disposed at an intermediate position of a passage, which is configured to allow the working fluid in the gas-liquid two-phase flow to flow therethrough, between the heat exchanger and the expander,
a cooling passage for cooling the power generator forms a part of the passage,
the expander and the power generator are accommodated inside one housing,
the housing is connected with an inlet pipe configured to allow the working fluid in the gas-liquid two-phase flow passing through the heat exchanger to flow into the housing, and an outlet pipe configured to allow the working fluid passing through the expander to flow out of the housing,
the cooling passage is configured such that a leading end thereof communicates with the inlet pipe of the housing, an intermediate position thereof passes through the power generator, and a trailing end thereof communicates with an inlet of the expander,
an output shaft of the expander and a drive shaft of the power generator are coaxially arranged and connected to each other,
a shaft-applied passage configured to allow the working fluid in the gas-liquid two-phase flow to flow therethrough is formed inside the output shaft and the drive shaft, and each of the output shaft and the drive shaft is implemented by a pipe, and
the cooling passage includes the shaft-applied passage and a communication passage that establishes communication between an outlet of the shaft-applied passage and an inlet of a fluid device of the expander.

2. The trilateral cycle system according to claim 1,
wherein the shaft-applied passage is formed inside both the output shaft and the drive shaft, and each of the output shaft and the drive shaft is implemented by a pipe, and
a pipe outer diameter of the output shaft is identical to a pipe inner diameter of the drive shaft, a leading end of the output shaft is disposed inside the drive shaft, and an outer peripheral surface of the output shaft is fixed to an inner peripheral surface of the drive shaft.

3. The trilateral cycle system according to claim 1,
wherein a trailing end of the inlet pipe is disposed inside the housing,
a pipe outer diameter of the drive shaft is equal to or smaller than a pipe inner diameter of the inlet pipe,
a leading end of the drive shaft is disposed inside the inlet pipe, and
the drive shaft rotatably communicates with an inside of the inlet pipe through the shaft-applied passage formed inside the drive shaft.

4. The trilateral cycle system according to claim 1,
wherein the expander and the power generator are connected by one output and drive shaft,
a shaft-applied passage configured to allow the working fluid in the gas-liquid two-phase flow to flow therethrough is formed inside the output and drive shaft, and the output and drive shaft is implemented by a pipe.

5. The trilateral cycle system according to claim 4, wherein the cooling passage includes only the shaft-applied passage and communicates with an inlet of a fluid device of the expander.

6. The trilateral cycle system according to claim 4, wherein the cooling passage includes the shaft-applied passage and a communication passage that establishes communication between an outlet of the shaft-applied passage and an inlet of a fluid device of the expander.

* * * * *